United States Patent [19]

Sirefelt

[11] Patent Number: 4,927,005
[45] Date of Patent: May 22, 1990

[54] ACTUATOR

[76] Inventor: Lars Sirefelt, Sisjövägen 321, S-436 00 Askim, Sweden

[21] Appl. No.: 264,953
[22] PCT Filed: Feb. 15, 1988
[86] PCT No.: PCT/SE88/00057
§ 371 Date: Oct. 19, 1988
§ 102(e) Date: Oct. 19, 1988
[87] PCT Pub. No.: WO88/06134
PCT Pub. Date: Aug. 25, 1988

[30] Foreign Application Priority Data

Feb. 19, 1987 [SE] Sweden ............................... 8700675

[51] Int. Cl.$^5$ ............................................. B65G 13/06
[52] U.S. Cl. .................................. 198/781; 192/93 R; 74/571 M
[58] Field of Search ............. 198/781, 460; 192/93 R, 192/11; 74/571 M, 570

[56] References Cited

U.S. PATENT DOCUMENTS

| 2,985,474 | 5/1961 | Cook | 74/571 M X |
| 3,537,568 | 11/1970 | Leach | 198/781 |
| 3,550,300 | 12/1970 | Roder | 74/571 M X |
| 3,956,965 | 5/1976 | Rusbach | 74/571 M X |
| 4,572,353 | 2/1986 | Felder | 198/781 X |
| 4,721,203 | 1/1988 | Kimball et al. | 198/781 |

FOREIGN PATENT DOCUMENTS

| 1181022 | 1/1985 | Canada . | |
| 2431076 | 3/1980 | France | 74/571 M |
| 474369 | 7/1972 | Japan | 74/571 M |
| 1099663 | 1/1968 | United Kingdom | 74/571 M |

Primary Examiner—Robert J. Spar
Assistant Examiner—Cheryl Gastineau

[57] ABSTRACT

Actuator for mechanically switching a mechanism (10) between at least two functional positions. The actuator comprises a rotationally symmetric inner rotatable member (23) rotatably journalled by means of an eccentrically located axle (25) and an outer rotatable member (24) journalled eccentrically about the inner rotatable member. It exhibits actuating members which, by changing position, influence the mechanism. The inner rotatable member and the outer rotatable member (24) are arranged to assume different angular positions, in part by turning of the inner rotatable member about its axle (25), thereby causing the outer rotatable member to turn, and in part by turning of the outer rotatable member (24) relative to the inner rotatable member, whereby the change of position of the actuating member is brought about.

3 Claims, 6 Drawing Sheets

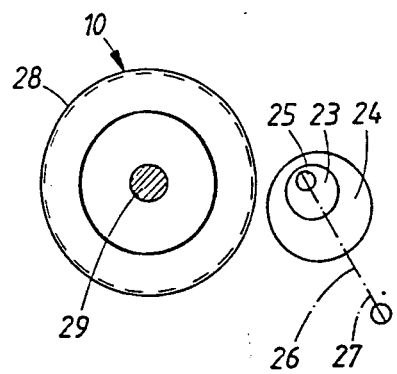
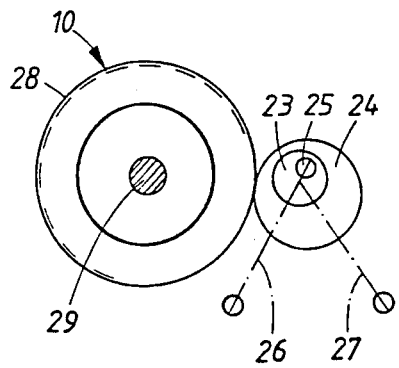
FIG.4　　　　FIG.5
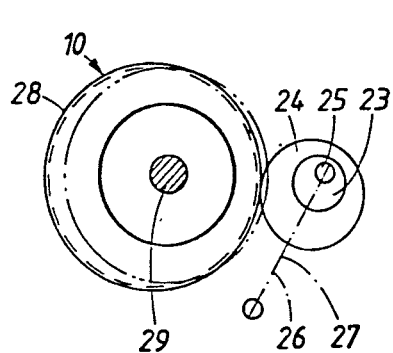
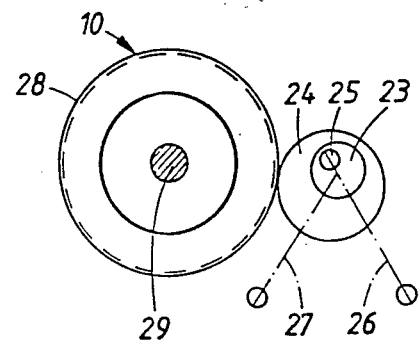
FIG.6　　　　FIG.7 ic
ACTUATOR

TECHNICAL FIELD

The present invention relates to an actuator for mechanically switching a mechanism between at least two functional positions.

TECHNICAL PROBLEM

In conveyor plants for example are found driving devices which are switchable between a driving state and a disengaged state. This switching is done depending upon the presence or absence of conveyed objects at certain points along a conveyor. For example, the state of the driving devices can depend on the position of two different sensors which, when using conventional technology, requires double switching devices for each driving device, which is an expensive solution requiring much space.

The object of the present invention is to provide an actuator which is provided to be controlled by means of two or more sensors.

THE SOLUTION

The said purpose is achieved by means of an actuator in accordance with the present invention, characterized by the actuator comprising a rotationally symmetrical inner rotatable member which is rotatably journalled by means of an eccentrically located axle, and, around this inner rotatable member, an eccentrically journalled outer rotatable member, exhibiting actuating members which, by changing position, influence said mechanism; by the inner rotatable member and the outer rotatable member being arranged to assume different rotational positions, in part by rotation of the inner rotatable member about its axle, thereby setting the outer rotatable member in said rotational movement, and in part by rotation of the outer rotatable member relative to the inner rotatable member, thus causing the said changing of position of the said actuating members; and by the said mechanism comprising a switching device provided with an element for switching the switching device between an engaged position and a disengaged position upon switching of the actuator between a centric and an eccentric position.

BRIEF DESCRIPTION OF THE DRAWINGS

The invention will be described below in more detail using an exemplifying embodiment with reference to the accompanying drawings, in which

FIGS. 4-7 show schematically a switching device contained in the roller conveyor and an associated actuator in different actuating positions;

BEST MODE OF CARRYING OUT THE INVENTION

Figure 1:
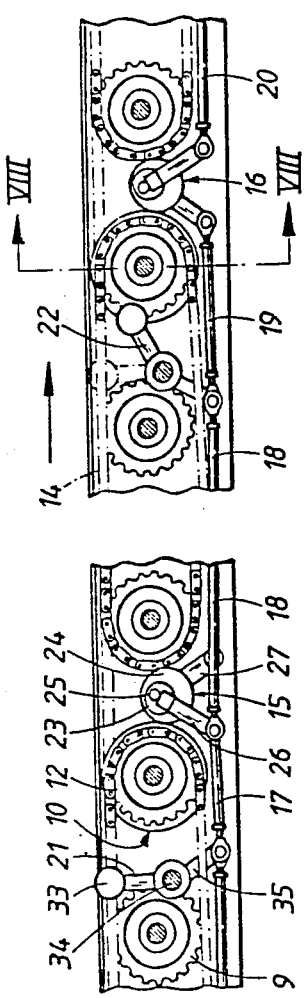
FIG. 1 shows a partially broken side view of a roller conveyor provided with actuators in accordance with the present invention.
Figure 2:
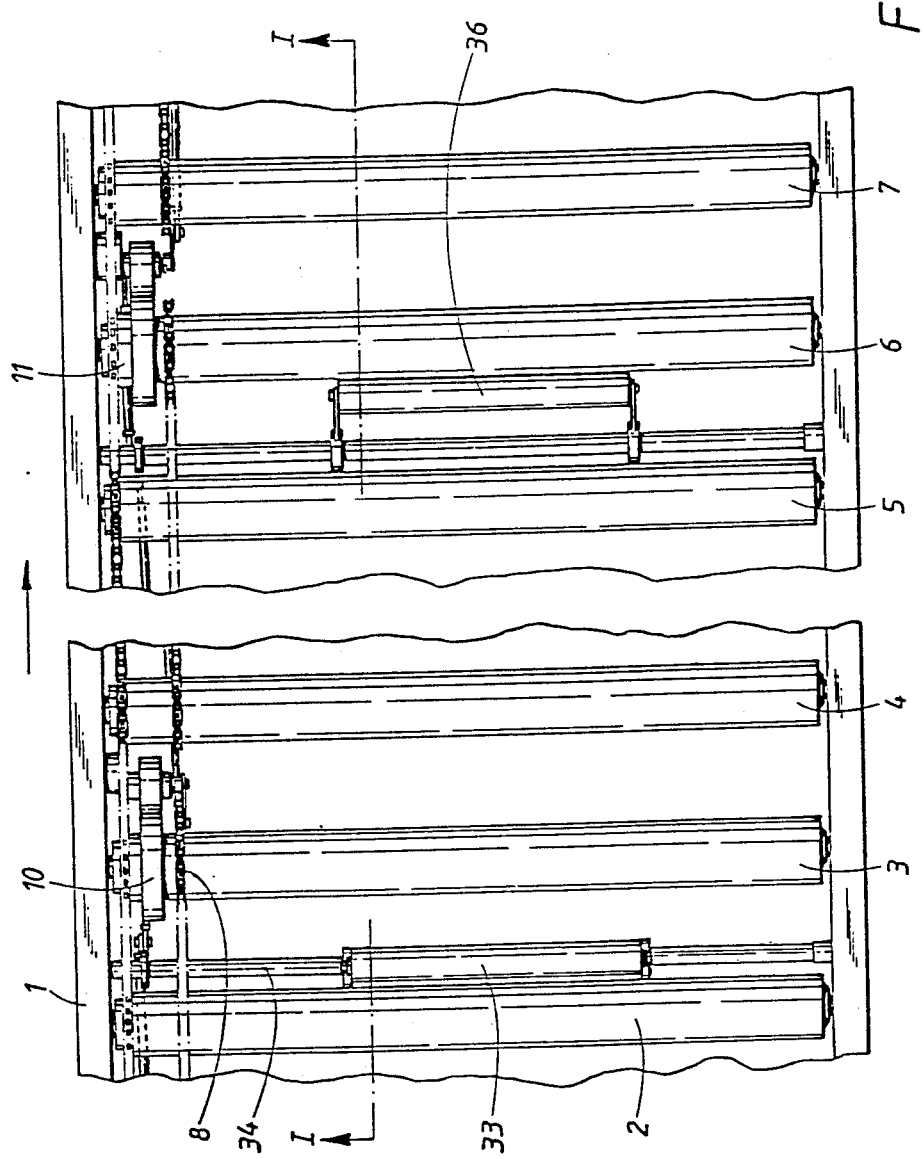
FIG. 2 shows a view from above of a conveyor provided with actuators according to the invention.
Figure 3:
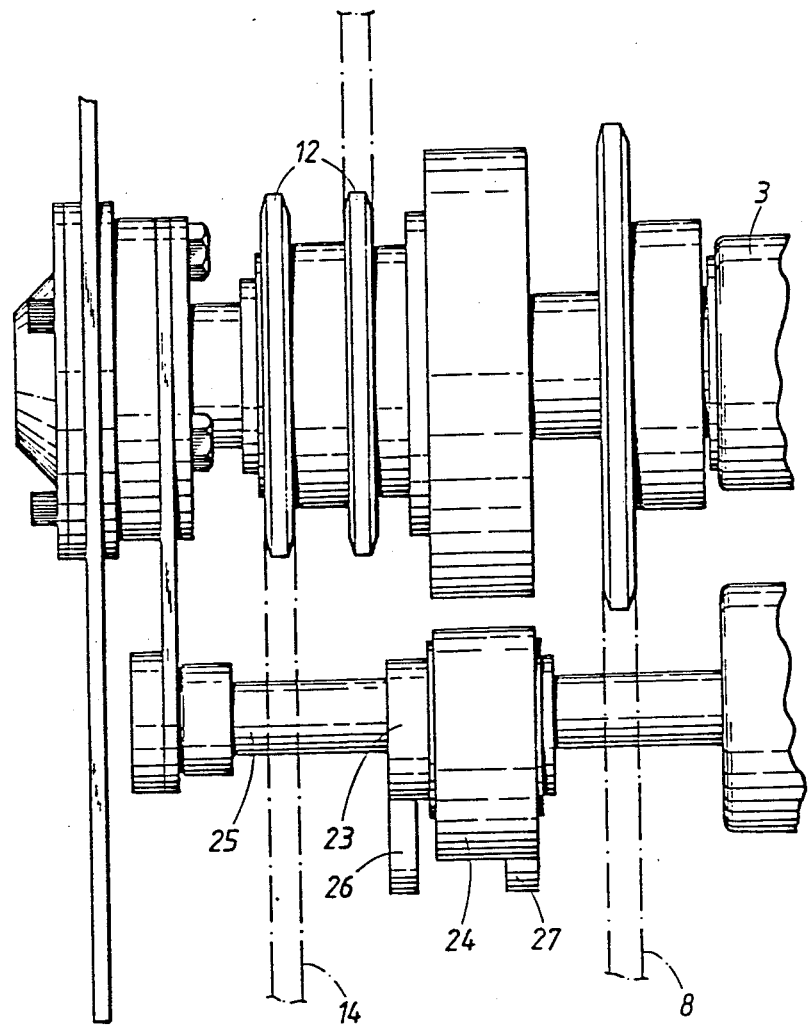
FIG. 3 is a view on an enlarged scale of a section of the roller conveyor including an actuator.

The roller conveyor, shown in FIGS. 1 and 2 as an example of the use of the invention, consists of a large number of driving rollers 2-7, which are rotatably journalled in a frame 1, and which are coupled in groups by means of a driving chain 8, one driving chain for each group, which engages a chain wheel provided for each driving roller 9. Each group of driving rollers is arranged to be switched between an engaged state and a disengaged state by means of a switching device 10, 11 mounted on one driving roller 3, 6 in each group. When the periphery of the switching device is pressed against, it is arranged so as to switch between an engaged position and a disengaged position and is e.g. of a type shown in the Canadian patent No. 1181022, the periphery of which is designed as a press ring, which, at a centric position in the switching device, maintains an engaged position, but, when moved to an eccentric position, switches the switching device to a disengaged position. The switching device exhibits a member which is fixedly connected with chain wheels 12, and another member, which is fixedly connected with the associated driving roller 3, 6. The chain wheels 12 are in turn connected to a driving motor via a drive chain 14.

According to the invention, actuators 15, 16 are provided for switching the switching devices 10, 11 by applying force against the periphery of the switching devices. In the illustrated example the actuators are activated by switching them by means of push rods 17, 18, 19, 20, two for each actuating member, each push rod being connected to a sensing member 21, 22. Each sensing member 21, 22 is connected to two push rods, namely, the one push rod of the one actuator and the other push rod of the other actuator.

The construction and function of the actuators 15, 16 is best seen in FIGS. 1, 3 and 4-7. The figures show that each actuator 15, 16 consists of two eccentrically, rotatably journalled rotatable members 23, 24, of which an inner rotatable member 23 is eccentrically journalled by means of a first bearing axle 25, and an outer rotatable member 24 is eccentrically journalled about the inner rotatable member 23, which thus forms a second bearing axle. Mechanically, the bearing is provided by the first axle 25, either by it being fixed and the inner rotatable body 23 being journalled on it, or by the axle being rotatably journalled in the frame, for example, by means of a bracket. The outer rotatable member 24 is journalled by it being provided with a cylindrical through bore or counter bore, which is eccentrically located. The two rotatable members 23, 24 are rotationally symmetrical (in the example shown they are cylindrical), and each is rigidly joined with a swinging arm 26, 27, which swinging arms are indicated schematically in FIGS. 4 to 7 by means of dash dotted lines. Each of the two swinging arms 26, 27 is arranged for switching between two swinging positions, so that there are four different position combinations for each actuator, as is seen in FIGS. 4-7. In the first position according to FIG. 4, both swinging arms 26, 27 are located at a far end position relative to the corresponding switching device 10 (in the example shown the swinging arms coincide), whereby the outer rotatable member is located at a distance from the press ring 28 of the switching device. The press ring 28, and therefore the switching device, are thus located in a non-activated position, which normally means that the switching device is in the engaged position, with the corresponding driving roller 3 being in the driving state.

FIG. 5 shows a second position, in which the swinging arm 26 of the inner rotatable member 23 is swung forward against the switching device, resulting in the inner rotatable member 23, due to its eccentric journalling about the axle 25, being swung forward clock-wise, which in turn leads to moving forward of the outer rotatable member 24 which, below, is referred to as the actuating member, against the press ring 28 of the switching device. The press ring of the switching device will, however, still not have been moved to an eccentric position, but rather, at most, the actuating member's 24 periphery just touches the periphery of the press ring.

FIG. 6 shows a third position, in which both swinging arms 26, 27 are brought forward against the switching device. Even the outer rotatable member 24 is thus rotated forward about the inner rotatable member 23, which is eccentrically located relative to the outer rotatable member, the inner member, as in the position shown in FIG. 5, being swung forward about its eccentric axle 25, which means that the periphery of the outer member 24, that is to say, the section of it located closest to the switching device which forms the actuating member for actuating the switching device, is brought forward additionally a short distance in such a way that the press ring 28 is displaced by the actuating member 24 to a position which is eccentric relative to the axis of rotation 29 of the switching device. This eccentric displacement of the press ring 28 means that the switching device 10 is switched to a disengaged position, i.e., in the example shown, so that the driving roller on which the switching device 10 is provided is not drivingly connected with the driving device (not shown in the drawing).

FIG. 7 shows a fourth position, in which the inner rotatable member 23 is swung back to its position shown in FIG. 4 by the corresponding swinging arm 26 having been returned to the starting position, whereas the other swinging arm 27 remains in its advanced position. The outer rotatable member 24 is thereby moved back a short distance in relation to the position shown in FIG. 6, so that the press ring 28 is not displaced eccentrically, which means that the switching device is in the engaged position, as in the positions shown in FIGS. 4 and 5. In the example shown the driving roller, to which the switching device is connected, is back in the driving position and is arranged to rotate together with the driving device of the plant.

Figure 8:
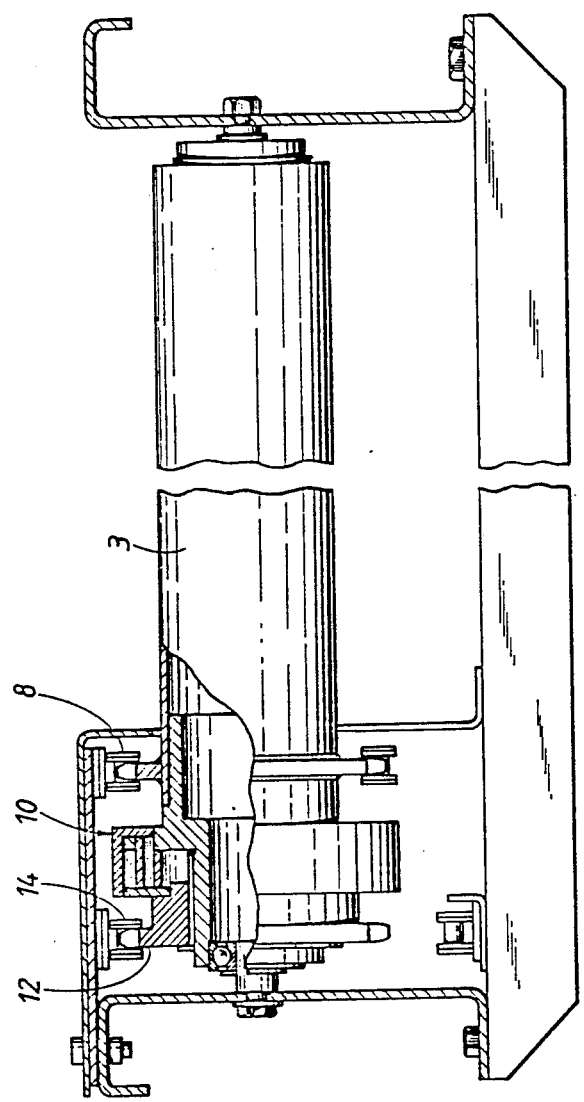
FIG. 8 shows a partially broken sectional view of the actuator in FIG. 1.

FIG. 8 shows in greater detail an example of the mechanical construction of a portion of a conveyor, on which the device according to the invention may be mounted. It shows schematically how the switching device 10 is divided into its two parts, which are arranged to be in either secure driving connection with each other or to be disengaged from each other.

Figure 9:
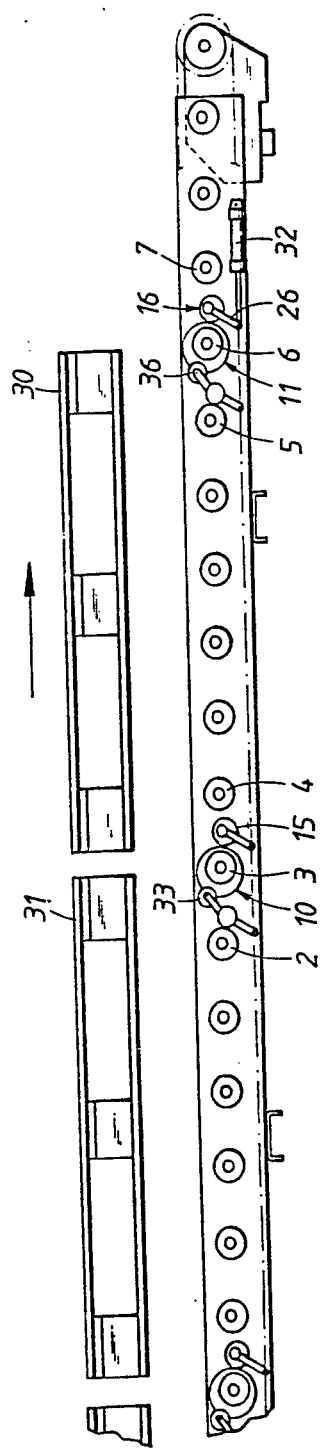
FIG. 9 shows schematically a side view of a modified embodiment of a roller conveyor.

Referring primarily to FIG. 9, but also to FIG. 1, the principle function of a portion of a conveyor, in which the device according to the invention may be mounted, will be described. The roller conveyor shown in FIG. 9 exhibits a number of switching devices 10, 11 provided at a distance from each other on certain ones of the rotatably journalled driving rollers 2-7, for example, on every seventh driving roller, i.e., with six driving rollers between each pair of switching devices, the seven driving rollers being connected to one another by means of the driving chain 8 and thus arranged so as to be in the engaged position or the disengaged position simultaneously by means of the switching device provided last in the group of driving rollers. By means of this construction the roller conveyor can thus be divided into a number of sections which can alternate in being switched between the driving position and the non-driving position. According to the invention the driving and the non-driving positions are determined not only by the presence of goods, for example, a pallet, on a certain section, but rather switching may also be controlled by an additional condition, i.e., the presence or absence of goods on a previous section, for example, in the form of a following pallet 31. FIG. 9 shows the end of a roller conveyor where the one swinging arm 26 is not connected to a sensor, but to a unit, for example, a piston assembly 32, which is activated arbitrarily as desired or by means of some automatic device. Sensors 33 are arranged one for each section and are located near the end of each section of driving rollers, but are placed before the last driving roller 3-6 in each section, and they stick up so that, in the presence of the goods, i.e., the pallets, they are pressed downwards and are arranged so as to rotate clock-wise. (The pallets 30, 31 are supported by the rollers 2, 3, 4, 5, 6, but are shown in FIG. 9 as being on a higher level for the sake of clarity.) Thus, when the sensors 33, 36 are not depressed, the actuators are in the position shown schematically in FIG. 4 with the switching devices being not activated and thus in the engaged position, i.e., a position in which the corresponding section of driving rollers is in the driving state in order to move the pallets 30, 31 forward. When a first pallet 30 is fed over the roller conveyor and thereby activates only one of the sensing members 33, 36 at a time, forward driving thus takes place the whole time, since the position shown in FIG. 6 is not assumed. When the pallet 30 reaches the last sensor 36 and the maneuvering unit 32 holds the swinging arm 36 and the inner rotatable member 23 of the actuator in the advanced position, the switching device 10 will switch since the sensing member 36 will then swing from the second position, shown in FIG. 5, to the third, activated switching position, shown in FIG. 6, leading to the section of the driving rollers 4 and 5 and the intermediate driving rollers, as well as the driving roller 6, becoming disengaged, whereby driving action will cease. At the same time as switching of the sensing member 36 takes place the one swinging arm 26 of the actuator 15 swings over, which, however, does not lead to switching of the preceding section of driving rollers, which are driven via the switching device 10, into the activated state but rather this section will be in the driving state until the following pallet 31 switches the sensing member 33. This switches the swinging arm 27 and thus the outer rotatable body 24, so that the actuating position shown in FIG. 6 is assumed and the preceding section of driving rollers including, among others, the driving rollers 2 and 3, will be disengaged.

This means that the two pallets 30, 31 will not be stopped by some stop dog so that they stand and skid on the underlying driving rollers. The actuator in the preceding section, etc, is thereby switched in a corresponding manner so that the pallets are stopped as they arrive in the queue formed. As soon as the first pallet 30 is removed from the place shown in FIG. 9, for example, by it being lifted away by means of a fork lift or by being pushed to the side onto a transversely oriented conveyor, the sensing member 36 is switched, which switches both of the actuating devices 15 and 16 to the driving position so that the following pallets and the remaining pallets are fed forward until the pallet 31 in turn activates the sensing device 35, is stopped, and so on. If it is desired to move the first pallet 30 forwards while the sensing member 36 is actuated, the maneuvering unit 32 is switched so that the corresponding swinging arm 26 is swung from the position shown in FIG. 9, whereby the furthermost section of driving rollers is engaged in the driving position.

The invention is not limited to the exemplifying embodiment described above and shown in the drawings but may be varied within the scope of the following claims. The actuator may for example be switched in a different manner. The power transmission of the mechanical sensing members may for example be done pneumatically or hydraulically by arranging a piston and cylinder system, e.g., of the type found in brake systems for vehicle brakes. Sensing may even be done electronically or optionally by means of position switches, photocells, or the like, which, via motors or electromagnets, turn the rotatable members in the actuators. The switching devices may have a different construction than the one described in the above cited patent. What is essential is that switching can be accomplished by the actuator of the chosen type being able to move against or away from an element on the switching device, thereby providing switching between the engaged and the disengaged positions.

What is claimed is:

1. Actuator included in a roller conveyor having a plurality of rotatable driving rollers (2-7) which are connected as sections to a driving device via a switching device (10) for each section, the sections of driving rollers being arranged to be switched by means of said switching devices between a driven state and a disengaged state depending on the presence of goods (30,31) on the respective section and the preceding section, the presence being sensed by means of a sensing member (33,36) provided for each section, said actuator (15,16) being provided at each switching device (10) for mechanically switching the switching device between at least two functional positions and comprising a rotationally symmetrical inner rotatable member (23) which is rotatably journalled by means of an eccentrically located axle (25), and, around said inner rotatable member, an eccentrically journalled outer rotatable member (24), which is provided with surfaces which by changing position, influence said switching device, the inner rotatable member (23) and the outer rotatable member (24) being arranged to assume different rotational positions, in part by rotation of the inner rotatable member about an axle (25), thereby setting the outer rotatable member in its rotational movement, and in part by rotation of the outer rotatable member (24) relative to the inner rotatable member, thus causing the said changing of position of the said actuator members, and said switching device being provided with an element (28) for switching the switching device between an engaged position and a disengaged position upon switching by means of the actuator (15,16) between a centric and an eccentric position, said sensing member (33,36) of each section being arranged, in the presence of goods on a certain section, to swing in part a first swinging arm (26) of the actuator belonging to this section and in part a second swinging arm (27) of the actuator (15,16) belonging to the following section.

2. Actuator according to claim 1, wherein the inner and outer rotatable members (23,24) each are connected to one of said first and second swinging arms (26,27), the swinging arms being arranged to assume different swinging positions, thereby bringing the said rotatable members with them.

3. Actuator according to claim 2, wherein the swinging arms (26,27) and thus the rotatable members (23,24) are provided to be switched between the following positions: a first position with both rotatable members (23,24) rotated away from the switching device (10); a second position in which only the inner rotatable member is rotated toward the switching device, whereas the rotational position of the outer rotatable member is maintained; a third position in which both rotatable members (23,24) are rotated toward the switching device; and a fourth position, in which only the outer rotatable member (24) is rotated toward the switching device, whereas the rotational position of the inner rotational member is maintained.

* * * * *